US010524616B2

(12) United States Patent
Contarino, Jr.

(10) Patent No.: US 10,524,616 B2
(45) Date of Patent: *Jan. 7, 2020

(54) HINGED-LID COOKING GRILL FOR COOKING PIZZA AND THE LIKE

(71) Applicant: Alfred F. Contarino, Jr., Boxford, MA (US)

(72) Inventor: Alfred F. Contarino, Jr., Boxford, MA (US)

(73) Assignee: AFC BUSINESS VENTURES, LLC, Boxford, MA (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/215,185

(22) Filed: Mar. 17, 2014

(65) Prior Publication Data

US 2015/0027432 A1 Jan. 29, 2015

Related U.S. Application Data

(60) Provisional application No. 61/862,660, filed on Aug. 6, 2013.

(51) Int. Cl.
*A47J 37/07* (2006.01)
*A47J 36/06* (2006.01)

(52) U.S. Cl.
CPC ....... *A47J 37/0763* (2013.01); *A47J 37/0704* (2013.01); *A47J 37/0786* (2013.01); *A47J 36/06* (2013.01)

(58) Field of Classification Search
CPC . A47J 37/0658; A47J 37/0704; A47J 37/0763
(Continued)

(56) References Cited

U.S. PATENT DOCUMENTS

| 833,529 A | 10/1906 | Jones |
| 1,751,219 A | 3/1930 | Seamon |

(Continued)

FOREIGN PATENT DOCUMENTS

| CN | 202386539 | 8/2012 |
| CN | 202537255 | 11/2012 |

(Continued)

OTHER PUBLICATIONS

Malloy, Ryan, "Plasticity," 2012, Vimeo video retrieved online from <https://vimeo.com/couchmode/user1057436/videos/sort:date/12827359> on Sep. 6, 2016.

(Continued)

*Primary Examiner* — Avinash A Savani
*Assistant Examiner* — Aaron H Heyamoto
(74) *Attorney, Agent, or Firm* — Fisherbroyles, LLP (57) ABSTRACT

A cooking grill for improved cooking of pizzas and other foods includes a base portion, a cooking grate supported on the base portion, and a lid hingedly-attached to the base and movable between an open position and a closed position in which a substantially-enclosed cooking chamber is defined between the base portion/cooking grate and the lid. The lid is specially-configured to define a window therein, for admitting passage into the cooking chamber along an entrance pathway extending horizontally from the window. The lid is specially-configured so that the window remains open and unobstructed while the lid is in a closed position. A handle is joined to the lid in a position outside of the entrance pathway, so that it does not interfere with insertion of pizza/foods into, or removal of pizza/foods from, the cooking chamber while the lid remains in the closed position.

23 Claims, 10 Drawing Sheets

(58) Field of Classification Search
USPC .................................................... 126/25 R
See application file for complete search history.

(56) References Cited

U.S. PATENT DOCUMENTS

| | | | |
|---|---|---|---|
| 2,015,295 A | 9/1935 | Steingruber |
| 2,127,146 A | 8/1938 | Smallen |
| 2,155,654 A | 4/1939 | Haley |
| 2,430,582 A | 11/1947 | Reich |
| 2,709,996 A | 6/1955 | Tescula |
| 2,842,116 A | 7/1958 | Hinderer |
| 2,898,846 A | 8/1959 | Del Francia |
| 2,940,381 A | 6/1960 | Cottongim |
| 3,152,242 A | 10/1964 | De Mott |
| 3,169,517 A | 2/1965 | Maier |
| 3,199,438 A | 8/1965 | Myler et al. |
| 3,299,800 A | 1/1967 | Angelo |
| 3,443,510 A | 5/1969 | Norton |
| 3,490,433 A | 1/1970 | Busenbarrick |
| 3,611,912 A | 10/1971 | Choc |
| 3,657,996 A | 4/1972 | Thompson |
| 3,783,855 A | 1/1974 | Newinger |
| 3,802,413 A | 4/1974 | Pepin |
| 3,938,494 A | 2/1976 | Clark |
| 3,947,657 A | 3/1976 | Ershler |
| 4,210,072 A | 7/1980 | Pedrini |
| 4,220,133 A | 9/1980 | Way, Jr. |
| 4,332,188 A | 6/1982 | Rhear |
| 4,362,093 A | 12/1982 | Griscom |
| 4,378,729 A | 4/1983 | Pierick |
| 4,384,513 A | 5/1983 | Pierick |
| 4,392,419 A | 7/1983 | Bonny |
| 4,437,396 A | 3/1984 | Plattner |
| 4,467,709 A | 8/1984 | Anstedt |
| 4,512,249 A | 4/1985 | Mentzel |
| 4,516,485 A | 5/1985 | Miller |
| 4,531,505 A | 7/1985 | Hait et al. |
| 4,598,634 A | 7/1986 | Van Horn, II |
| 4,718,400 A | 1/1988 | Lotz et al. |
| 4,721,037 A | 1/1988 | Blosnich |
| 4,777,927 A | 10/1988 | Stephen |
| 4,800,865 A | 1/1989 | Setzer |
| 4,840,118 A | 6/1989 | Rinehart |
| 4,962,696 A | 10/1990 | Gillis |
| 5,088,470 A | 2/1992 | James, Jr. et al. |
| 5,186,159 A | 2/1993 | Crow, Jr. et al. |
| 5,213,027 A | 5/1993 | Tsotsos et al. |
| 5,222,475 A | 6/1993 | Greener |
| 5,237,914 A | 8/1993 | Carstensen |
| 5,259,299 A | 11/1993 | Ferraro |
| D344,871 S | 3/1994 | Keller |
| 5,315,922 A | 5/1994 | Keller |
| 5,333,540 A | 8/1994 | Mazzocchi |
| 5,347,978 A | 9/1994 | Zuran |
| 5,355,868 A | 10/1994 | Haen |
| 5,365,833 A | 11/1994 | Chen |
| 5,368,009 A | 11/1994 | Jones |
| 5,404,795 A | 4/1995 | Coble |
| 5,490,452 A | 2/1996 | Schlosser |
| 5,553,601 A | 9/1996 | Parker et al. |
| 5,586,488 A | 12/1996 | Liu |
| 5,678,531 A | 10/1997 | Byers et al. |
| 5,768,977 A | 6/1998 | Parris |
| 5,850,780 A | 12/1998 | Mascia |
| 5,884,555 A | 3/1999 | Chang |
| 5,909,729 A | 6/1999 | Nowicke |
| 5,911,812 A | 6/1999 | Stanek et al. |
| 5,960,782 A | 10/1999 | Clements et al. |
| 6,000,389 A | 12/1999 | Alpert |
| 6,024,081 A | 2/2000 | Libertini, Jr. |
| 6,029,649 A | 2/2000 | Su |
| 6,039,039 A | 3/2000 | Pina, Jr. |
| 6,064,042 A | 5/2000 | Glucksman et al. |
| 6,114,665 A | 9/2000 | Garcia et al. |
| 6,153,857 A | 11/2000 | Gunnels |
| 6,158,330 A | 12/2000 | Andress |
| 6,187,359 B1 | 2/2001 | Zuccarini |
| 6,260,478 B1 | 7/2001 | Harneit |
| 6,308,616 B1 | 10/2001 | Johnson |
| 6,508,165 B2 | 1/2003 | Johnson |
| 6,546,845 B1 | 4/2003 | Lanzilli |
| 6,640,695 B2 | 11/2003 | Stark |
| 6,705,307 B2 | 3/2004 | Alden et al. |
| 6,892,722 B1 | 5/2005 | Francies et al. |
| 6,931,985 B1 | 8/2005 | Attic |
| 7,163,011 B2 | 1/2007 | Pestrue |
| 7,686,010 B2 | 3/2010 | Gustavsen |
| 7,905,225 B2 | 3/2011 | Contarino |
| D645,295 S | 9/2011 | Klesath |
| 8,261,732 B2 | 9/2012 | Contarino, Jr. |
| 8,267,078 B2 | 9/2012 | Kuntz |
| 8,578,927 B2 | 11/2013 | Gustaysen |
| 9,198,538 B2 | 12/2015 | Safar |
| 2002/0017290 A1 | 2/2002 | Hines, Jr. |
| 2002/0020303 A1 | 2/2002 | Johnson |
| 2003/0145740 A1 | 8/2003 | Stark |
| 2003/0213484 A1 | 11/2003 | Alden et al. |
| 2004/0112226 A1 | 6/2004 | Johnston et al. |
| 2005/0039612 A1 | 2/2005 | Denny |
| 2006/0000365 A1 | 1/2006 | Attic |
| 2006/0102015 A1 | 5/2006 | Baker et al. |
| 2006/0102167 A1 | 5/2006 | Driscoll |
| 2006/0112948 A1 | 6/2006 | Ducate et al. |
| 2006/0191528 A1 | 8/2006 | Spangrud |
| 2007/0163568 A1 | 7/2007 | Murray et al. |
| 2007/0175467 A1* | 8/2007 | Liu ..................... A47J 37/0704 |
| | | 126/25 R |
| 2007/0221191 A1* | 9/2007 | O'Brien ............. A47J 37/0713 |
| | | 126/25 R |
| 2007/0277800 A1 | 12/2007 | Chiang |
| 2009/0064872 A1 | 3/2009 | Zisserson |
| 2009/0078246 A1 | 3/2009 | Leavens et al. |
| 2009/0090348 A1 | 4/2009 | Contarino |
| 2009/0101024 A1 | 4/2009 | Button |
| 2010/0124596 A1* | 5/2010 | Nelson .................. A23L 1/0128 |
| | | 426/523 |
| 2010/0132689 A1* | 6/2010 | Contarino, Jr. ....... A47J 37/067 |
| | | 126/25 B |
| 2010/0147281 A1 | 6/2010 | Gustavsen |
| 2010/0147285 A1 | 6/2010 | Seong |
| 2011/0214662 A1 | 9/2011 | Contarino |
| 2012/0024171 A1 | 2/2012 | Estes |
| 2014/0251160 A1 | 9/2014 | Contarino |
| 2015/0027432 A1 | 1/2015 | Contarino |
| 2015/0164278 A1* | 6/2015 | Kohler ................ A47J 37/0623 |
| | | 99/340 |

FOREIGN PATENT DOCUMENTS

| | | | | |
|---|---|---|---|---|
| DE | 3926182 A1 | 2/1991 | | |
| DE | 9311876 | 11/1993 | | |
| DE | 202005003982 | 6/2005 | | |
| FR | 2635258 A1 * | 2/1990 | ............... A21B 1/52 |
| GB | 2143119 A | 2/1985 | | |
| GB | 2489421 A * | 10/2012 | ............. F24B 1/003 |
| JP | 2006102488 | 4/2006 | | |
| WO | 2011027096 | 3/2011 | | |
| WO | 2012159131 | 11/2012 | | |

OTHER PUBLICATIONS

PizzaHacker's BackYard, LLC, "The Pizza Hacker.com," 2013, retrieved online from <http://thepizzahacker.com/> retrieved on Sep. 6, 2016.

Ah Nom Nom: Pizza Hacker—Best Pizza Food Cart—San Francisco, Sep. 22, 2009, YouTube, <https://www.youtube.com/watch?v=RLC-SIGpZkE >.

"Pizza Hacker—San Fransico, CA", Feb. 23, 2010, YouTube, https://youtu.be/-x9IErbHJgg.

Chinese Office Action dated Apr. 3, 2016 for Chinese Application No. 201410200874.1, including English translation.

(56) References Cited

OTHER PUBLICATIONS

Webpage for "Amazon.com : Weber 7403 Char-Basket Charcoal Briquet Holders : Grill Parts: Patio, Lawn & Garden" from Amazon.com, http://www.amazon.com/Weber-7403-Char-Basket-Charcoal-Briquet/dp/B000WEMGM4/ref=sr_1_1ie=UTF8&qid=1402322800&sr=81&keywords=weber+7403+charbasket+charcoal+briquet+holders, retrieved on Nov. 2, 2012.
Webpage for "Grilling Accessory Grill Accessories Pizza Stone Pizza Ovens" from Red Sky Grilling Products, http://redskygrilling.com/, retrieved on Oct. 23, 2012.
Chinese Office Action dated Nov. 9, 2016, for Chinese Application No. 201410200874.1, including English translation.
Chinese Office Action dated Jul. 27, 2017 for Chinese Application No. 201410200874.1, including partial English language translation.

\* cited by examiner

HINGED-LID COOKING GRILL FOR COOKING PIZZA AND THE LIKE

CROSS-REFERENCE TO RELATED APPLICATION

This application is based on, and claims the benefit of priority to, U.S. Provisional Application No. 61/862,660, filed Aug. 6, 2013, the entire disclosure of which is fully incorporated herein by reference.

FIELD OF THE INVENTION

The present invention relates generally to a cooking apparatus. More particularly, the present invention relates to a hinged-lid cooking grill for cooking pizzas and other foods in an improved manner.

BACKGROUND

Figure 1:
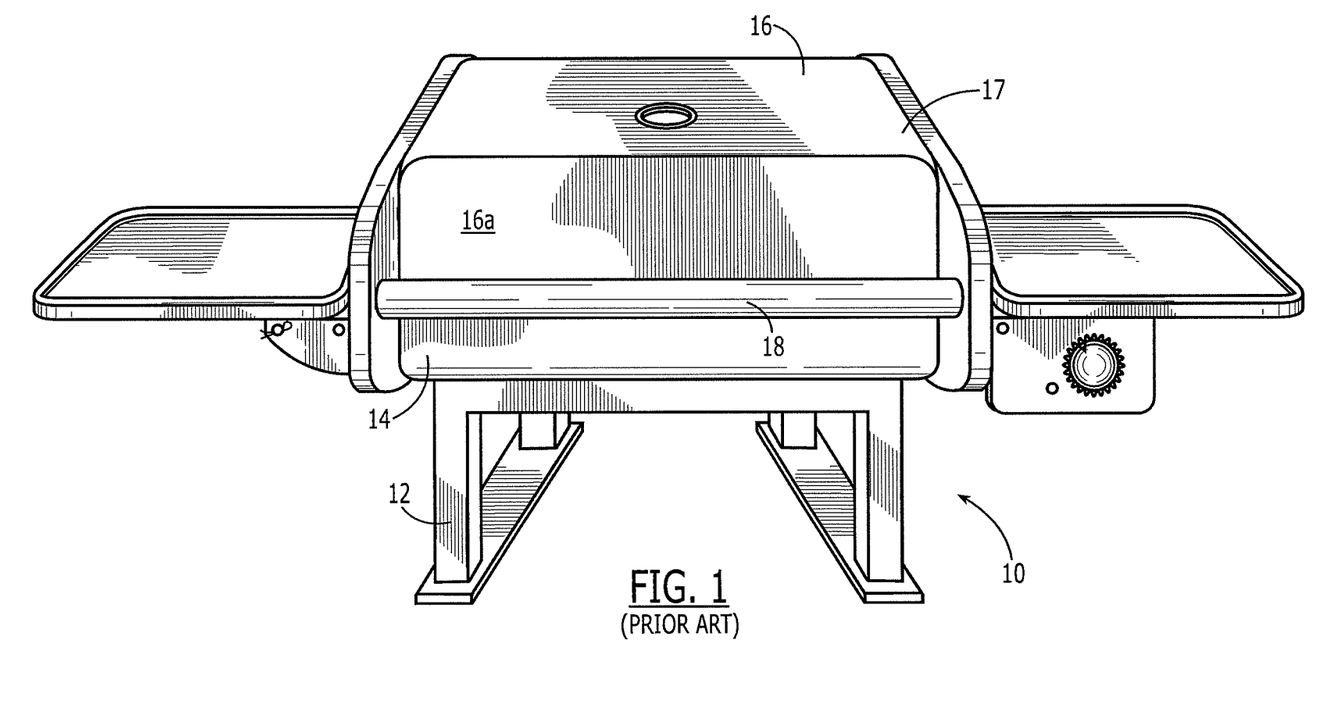
FIG. 1 shows a conventional hinged-lid grill exemplary of the prior art, showing the grill with the lid in a closed position.
Figure 2:
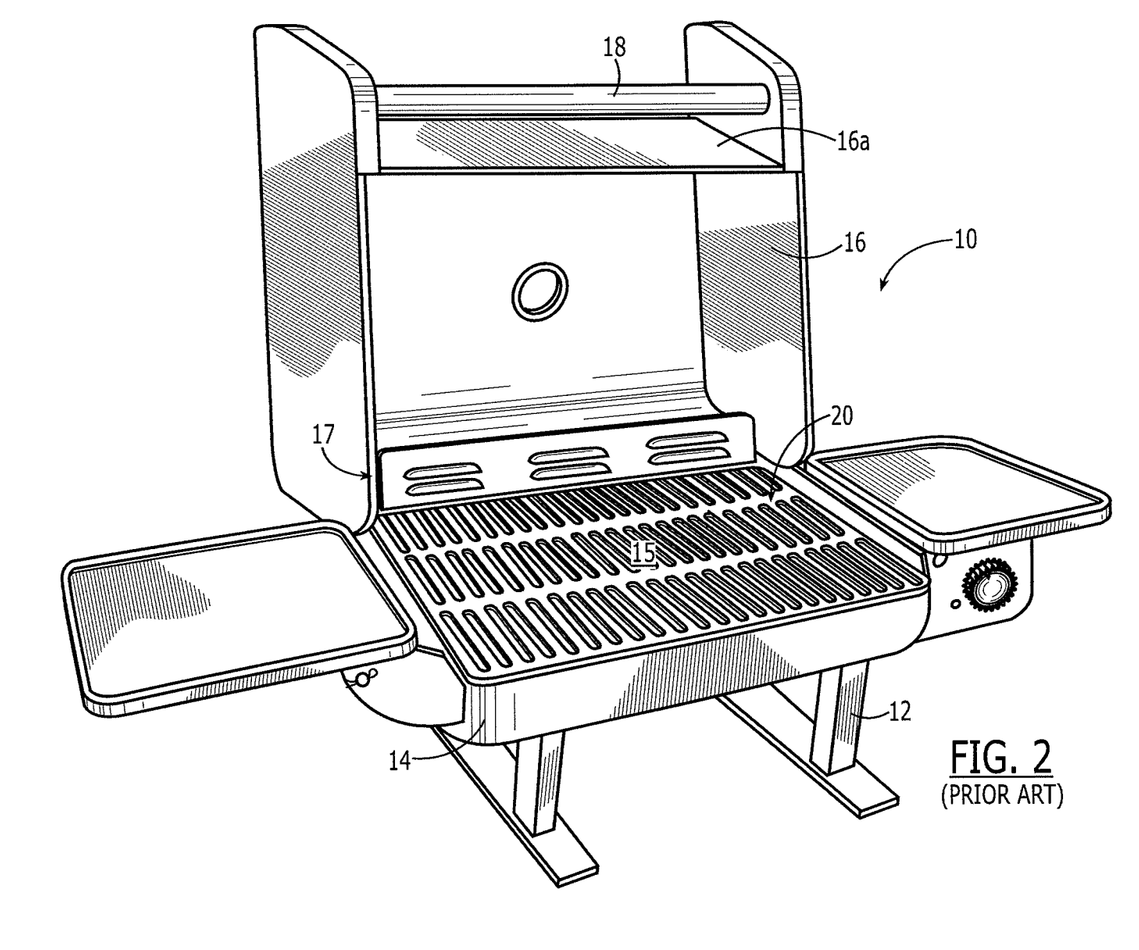
FIG. 2 shows a conventional hinged-lid grill exemplary of the prior art, showing the grill with the lid in an open position.

People often wish to cook on their outdoor cooking grills foods, such as pizza, that are not necessarily traditionally considered grill foods. An exemplary hinged-lid grill 10 of the prior art is shown in FIGS. 1 and 2. The grill 10 is exemplary in that it includes a frame 12 supporting a lower base portion 14 to which an upper lid 16 is hingedly attached, typically toward the rearward edge of the base portion 12, by hinges 17. The base portion 14 and lid 16 cooperate to define therebetween a cooking chamber 15. The cooking chamber houses a grilling surface such as grate 20 (FIG. 2) that is supported in or on the lower base portion 14. The upper lid 16 includes a handle 18. Often, the handle is a straight, hollow metal tube supported between side portions of the upper lid 16. The handle is typically oriented toward the front of the grill in alignment with a front surface 16a of the upper lid 16, as shown in the exemplary grill of FIGS. 1 and 2.

A heat source is housed below the grate. The cooking chamber may be heated by charcoal, wood or even an electric heating element placed in the bottom of the cooking chamber, or more typical for this particular style of grill, by liquid fuel, such as natural gas or propane.

With respect to pizza, the desired cooking temperature for many pizza recipes is very high, on the order of about 600 to 750° Fahrenheit or more. It is important that the temperature within the cooking chamber be particularly consistent, both spatially (the temperature is substantially the same everywhere within the cooking chamber) and temporally (the temperature does not fluctuate significantly with time).

First, the temperature should be spatially consistent so all of the ingredients cook properly. A common problem with cooking pizza, particularly in grills, is that the crust cooks too quickly relative to the ingredients on top of the crust such that the crust becomes too dry or even burns before all of the ingredients on top of the pizza are fully cooked or properly melted. Thus, temperature uniformity as a function of height above the heating element (e.g., charcoal, wood, or flame burners) is desired. Furthermore, if the temperature is not uniform in the horizontal direction, some sections of the crust may burn before other sections of the crust are fully baked.

Even further, maintaining a consistent temperature over time also is often important to cooking pizza (as well as many other foods). First, a consistent, proper temperature will, of course, cause the food to cook faster than a fluctuating temperature and temperature fluctuations can lead to the food not cooking properly all the way through to the center.

Often, it is particularly difficult to maintain consistent temperature in conventional cooking grills for several reasons. First, in a conventional hinged-lid grill, such as many conventional gas grills, the grill must be opened (by pivoting the hinged lid upwardly to an open position) to place food on the grill, to remove food from the grill, and to observe the cooking food. Since heated air rises relative to surrounding cooler air, each time the grill's lid is opened, essentially all of the heated air in the cooking chamber rises and escapes, requiring the chamber to heat up again after the lid is pivoted downwardly to close the grill's cooking chamber. Not only could this lengthen the time required to cook the food, but it could lead to uneven cooking since the air in the space beneath the food is likely to remain much hotter or at least heat up much more quickly than the air in the space above the food after each opening of the lid. This is particularly problematic with respect to cooking pizzas because the pizza dough and/or the solid surface on which the pizza must sit (such as a pizza stone) forms a large uninterrupted barrier between the air space below the pizza and the air space above the pizza. Also, since pizza recipes often require extremely high temperatures, temperature differentials can be significant.

SUMMARY

The present invention pertains to a cooking grill, especially grills including a hinged lid, for improved cooking of pizzas and other foods. The grill may include a frame, a base portion supported on the frame, a cooking grate supported on said base portion, and a lid hingedly-attached to the base and movable between an open position and a closed position in which a substantially-enclosed cooking chamber is defined between the base portion and the lid. In these respects, the grill may be largely conventional. In accordance with the present invention, the lid is specially-configured to define a window therein for admitting passage into the cooking chamber along an entrance pathway extending horizontally from the window, while the lid is in a closed position. Further, in accordance with the present invention, a handle is joined to the lid in a position outside of the entrance pathway, so that it does not interfere with insertion of pizza/foods into, or removal of pizza/foods from, the cooking chamber while the lid remains in the closed position.

BRIEF DESCRIPTION OF THE FIGURES

An understanding of the following description will be facilitated by reference to the attached drawings, in which.

DETAILED DESCRIPTION

The present invention provides a hinged-lid grill 10 that is specially-configured for use to cook foods at a higher average temperature, and/or with less temperature variability, thereby yield better cooking results, particularly when used as a pizza oven for cooking pizzas. Generally, the hinged-lid grill includes structures and components similar to those of conventional hinged-lid grills. However, a hinged-lid grill in accordance with the present invention includes a lid defining an unobstructed opening—i.e., one that is not configured to be closable by a door, flap or drawer, etc.—when the lid is in the closed position, and a handle joined to the lid that is specially configured not to obstruct an entrance pathway for loading foods into the grill through the opening while the lid remains in the closed position.

Figure 3:
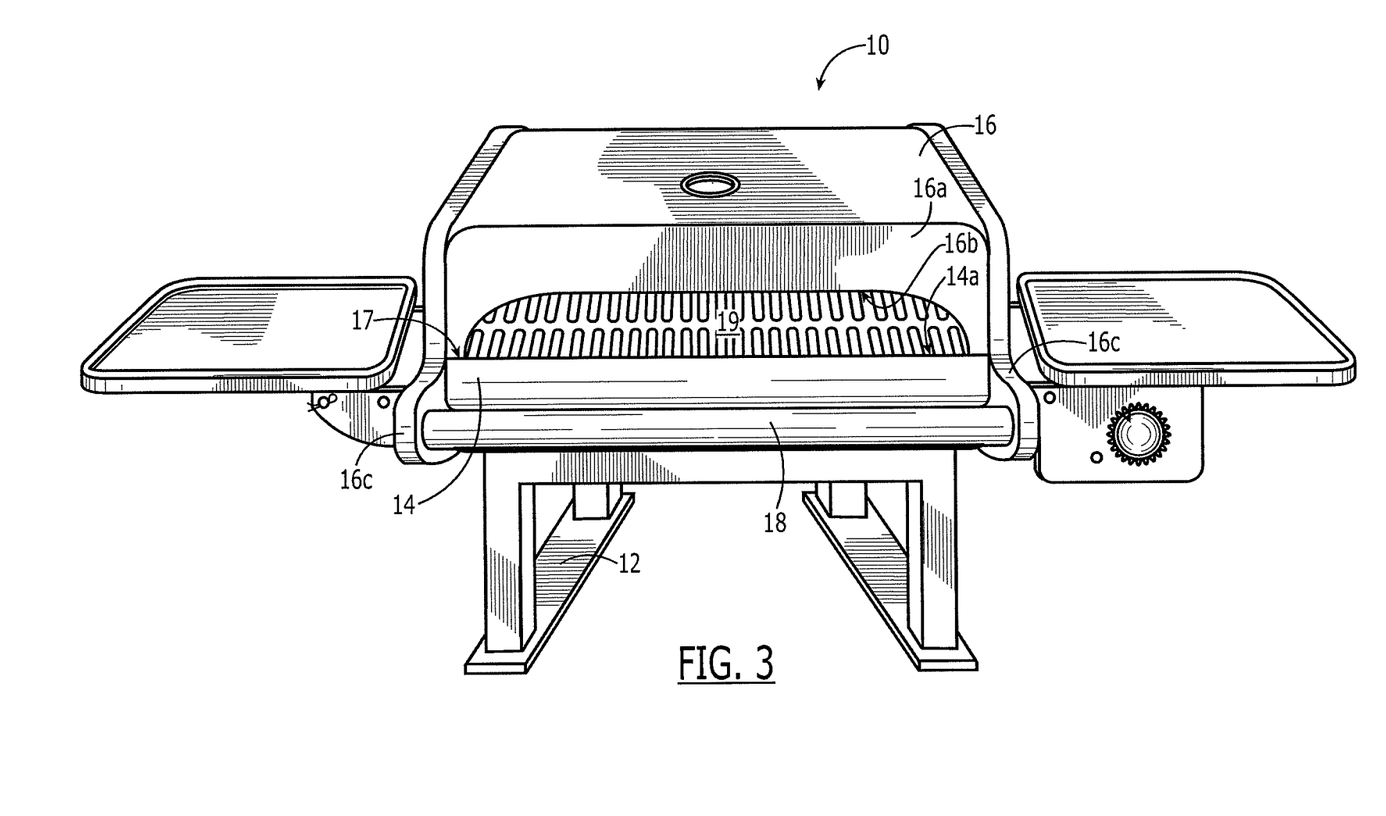
FIG. 3 is a perspective view of a hinged-lid grill in accordance with a first exemplary embodiment of the present invention.
Figure 4:
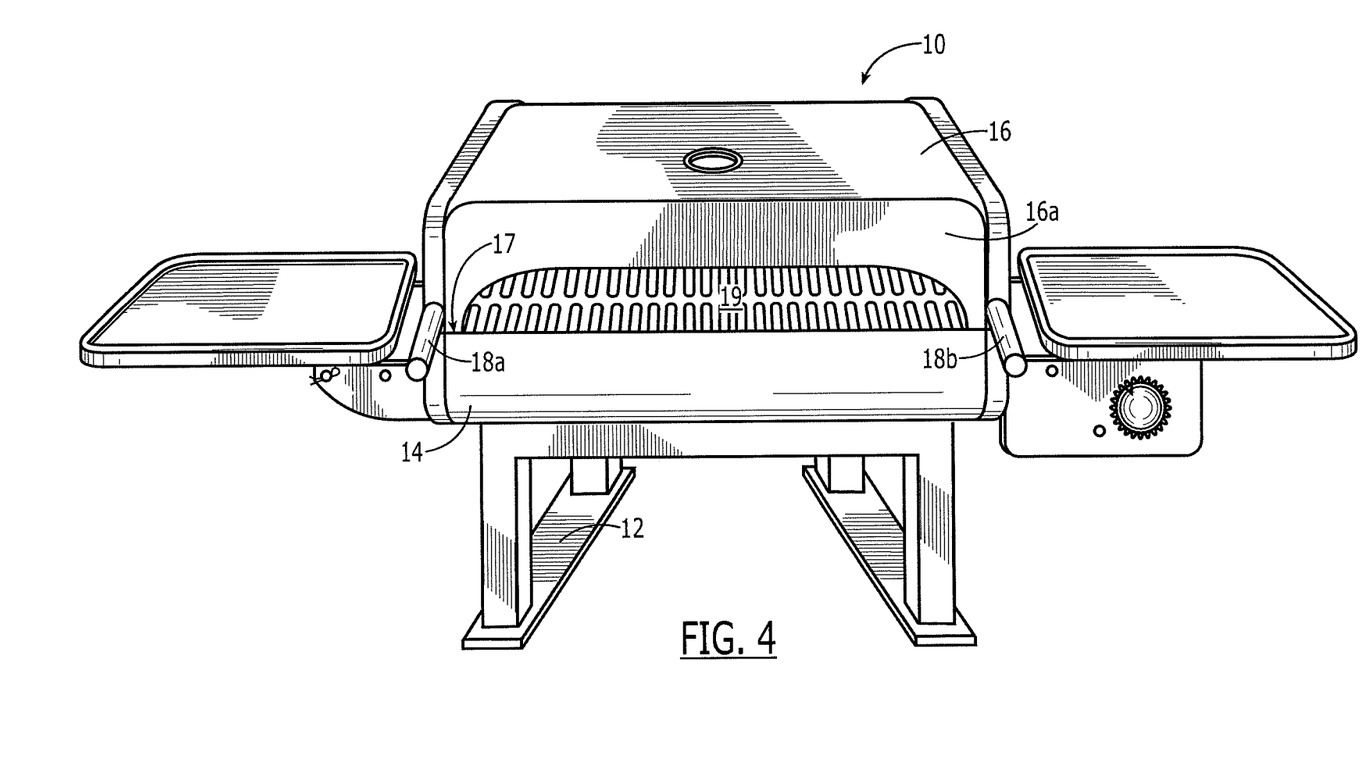
FIG. 4 is a perspective view of a hinged-lid grill in accordance with a second exemplary embodiment of the present invention.
Figure 5:
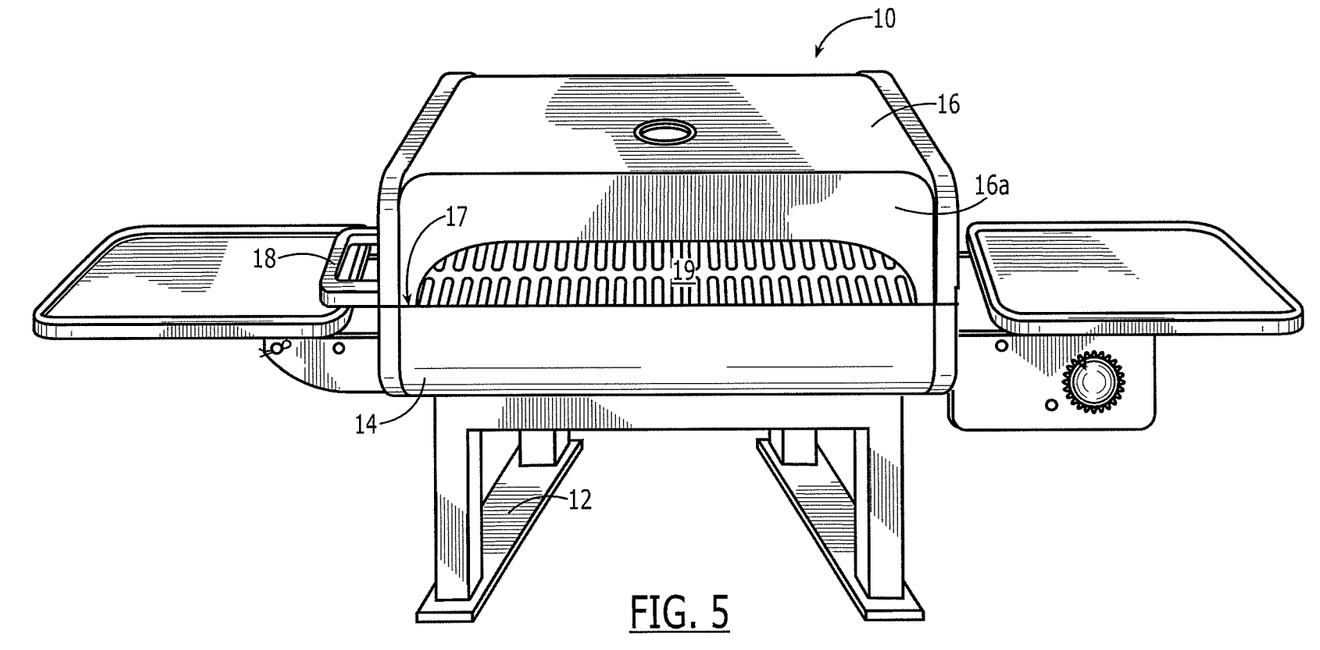
FIG. 5 is a perspective view of a hinged-lid grill in accordance with a third exemplary embodiment of the present invention.

Referring now to FIGS. 3-5, exemplary alternative embodiments of grills 10 in accordance with the present invention are shown. Consistent with grills of the prior art, each exemplary grill 10 in FIG. 3-5 includes a frame 12 supporting a lower base portion 14 to which an upper lid 16 is hingedly attached by a hinge 17. The base portion 14 and lid 16 cooperate to define there-between a cooking chamber 15. The cooking chamber houses a grilling surface such as grate that is supported in or on the lower base portion 14.

In accordance with the present invention, the upper lid 16 is specially-configured to define an open and unobstructed window 19, e.g., in a sidewall 16a of the lid 16, as shown in FIGS. 3-5. The lid is configured such that the window 19 remains open and unobstructed even when the lid is in the closed position, in which the lid generally abuts or otherwise mates with the base portion of the grill, as shown in FIG. 3. Further, the grill 10 is preferably configured such that it does not include any structure, such as a door, flap, hinge, cover, or drawer, that is operable to close or cover the window 19. The window 19 is dimensioned for admitting passage of foods and/or utensils through the window 19 and into the cooking chamber while the lid remains in the closed position. The window is dimensioned to be large enough both in the horizontal direction and in the vertical direction to allow easy insertion and removal of a pizza from the cooking chamber. Thus, the window 19 allows a pizza to be removed from the cooking chamber 15, e.g., using a pizza peel, without having to further open the grill's lid 16, which would allow essentially all of the heat to escape. Preferably, the window is also dimensioned to be small enough so as not to allow a significant amount of heat to escape through the opening. Since heated air tends to rise, a vertically oriented side window 19 will not let excessive amounts of heat escape from the cooking chamber 15 through window 19. The window permits constant visual access to the food cooking inside the cooking chamber without the need to remove the food from the cooking chamber. In one embodiment, the lid 16 includes a non-linear peripheral edge 16b that defines the window 19 in conjunction with an upper edge 14a of the base portion 14.

In certain embodiments, the sidewall 16a may be generally planar, and the window is defined in the generally planar sidewall. In such an embodiment, the sidewall 16a includes a generally planar portion extending around the window 19.

Further, the upper lid 16 supports a handle 18. In contrast to conventional grills of the prior art, a handle in accordance with the present invention is specially positioned and/or configured so that it remains misaligned with the window 19. More specifically, the handle is provided such that it does not enter an entrance pathway extending horizontally from the window. In this manner, food and/or utensils may be translated in a horizontal direction, from a location outside the grill, to a position with the grill's cooking chamber 15, without interference from the handle 18. Further, it may be preferable that no portion of the handle is located above an upper, or a lower, edge of the window, so that hot air exiting the cooking chamber via the window 19 will tend not to wash over the handle 18 and cause the handle to become uncomfortably hot to the touch.

FIG. 3 shows a grill having a first exemplary embodiment of a handle 18 in accordance with the present invention. In this embodiment, the handle is similar to many conventional handles in that it is essentially a straight bar or tube extending laterally across the front of the grill 10, and thus spans the window 19. However, in this embodiment, the lid 16 further includes handle supports 16c extending downwardly from the lid to support the handle 18 below the window 19, and more particularly, below the upper edge 14a of the base portion 14. In alternative embodiments, the handle may not be straight, but may have a portion that spans, and is positioned below, the window 19.

FIG. 4 shows a grill having a second exemplary embodiment of a handle 18 in accordance with the present invention. In this embodiment, the handle includes one or more straight bars/tubes/members 18a, 18b extending longitudinally (in the front-to-back direction) from locations toward the sides of the grill 10. In this embodiment, the handle(s) does/do not span the window, and thus need not be positioned below the window.

FIG. 5 shows a grill having a third exemplary embodiment of a handle 18 in accordance with the present invention. In this embodiment, the handle includes a handle member 18a extending laterally away from a side of the grill 10. In this embodiment, the handle does not span the window, and thus need not be positioned below the window.

Any suitable handle may be provided, as long as the handle does not obstruct the window 19 or extend into an entrance pathway extending horizontally from the window 19.

Figure 6:
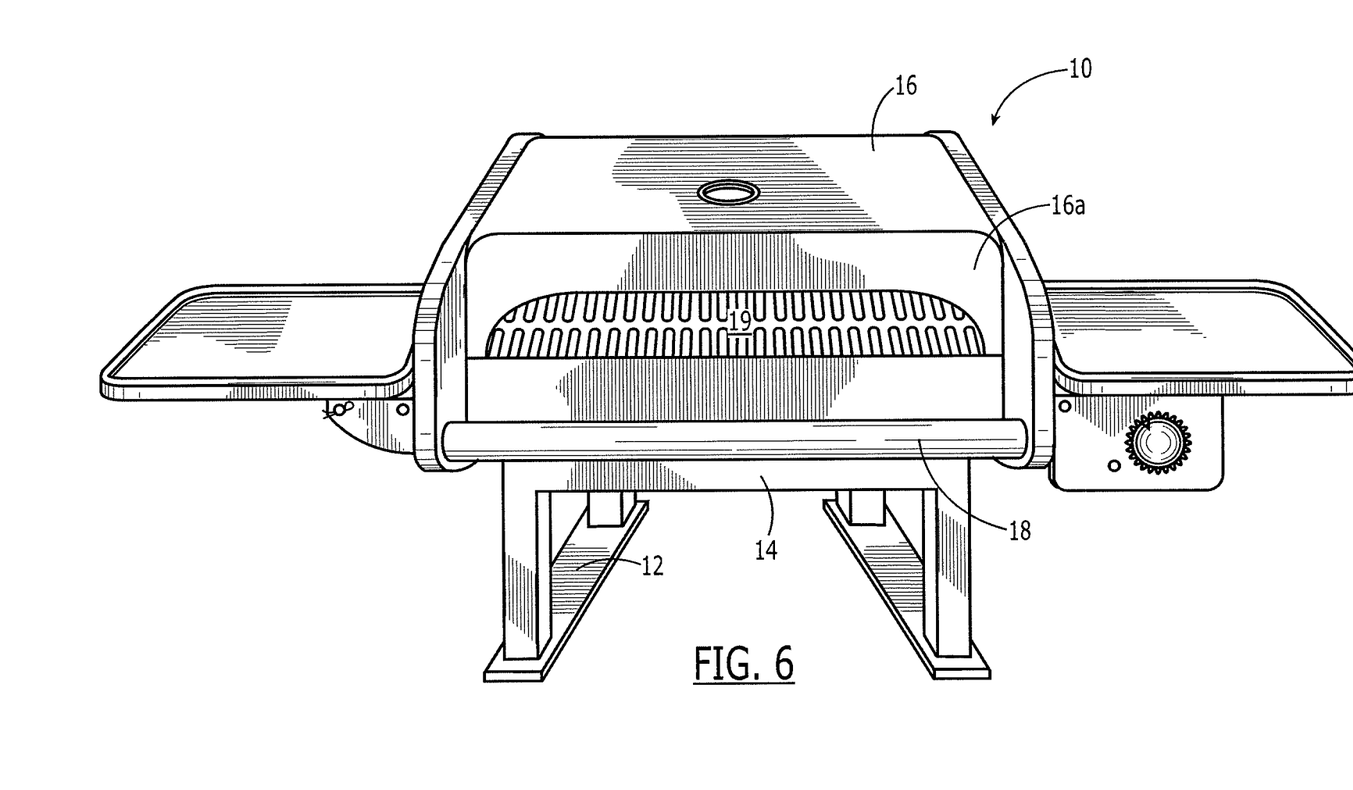
FIG. 6 is a front view of an alternative exemplary grill.
Figure 7:
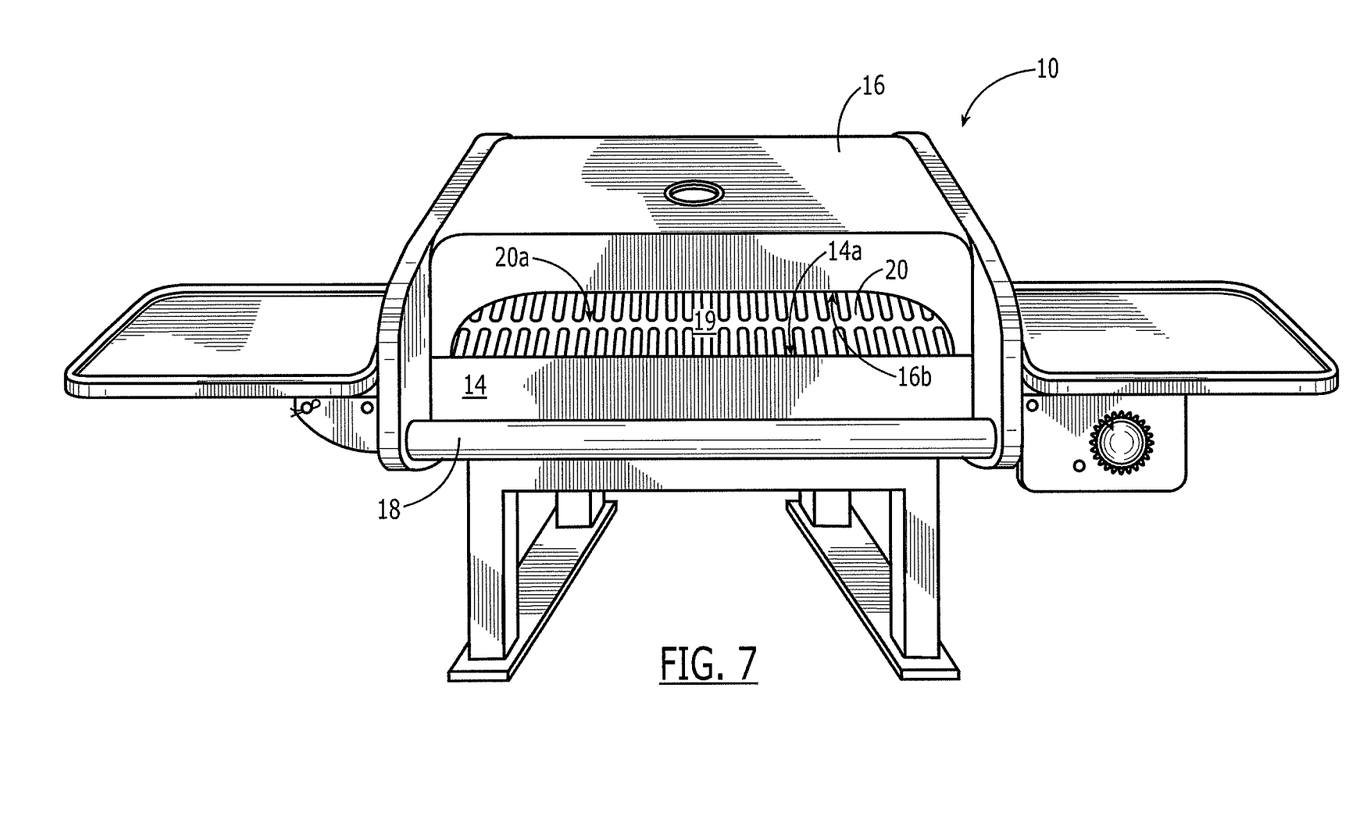
FIG. 7 is a perspective view of the grill of FIG. 6.
Figure 8:
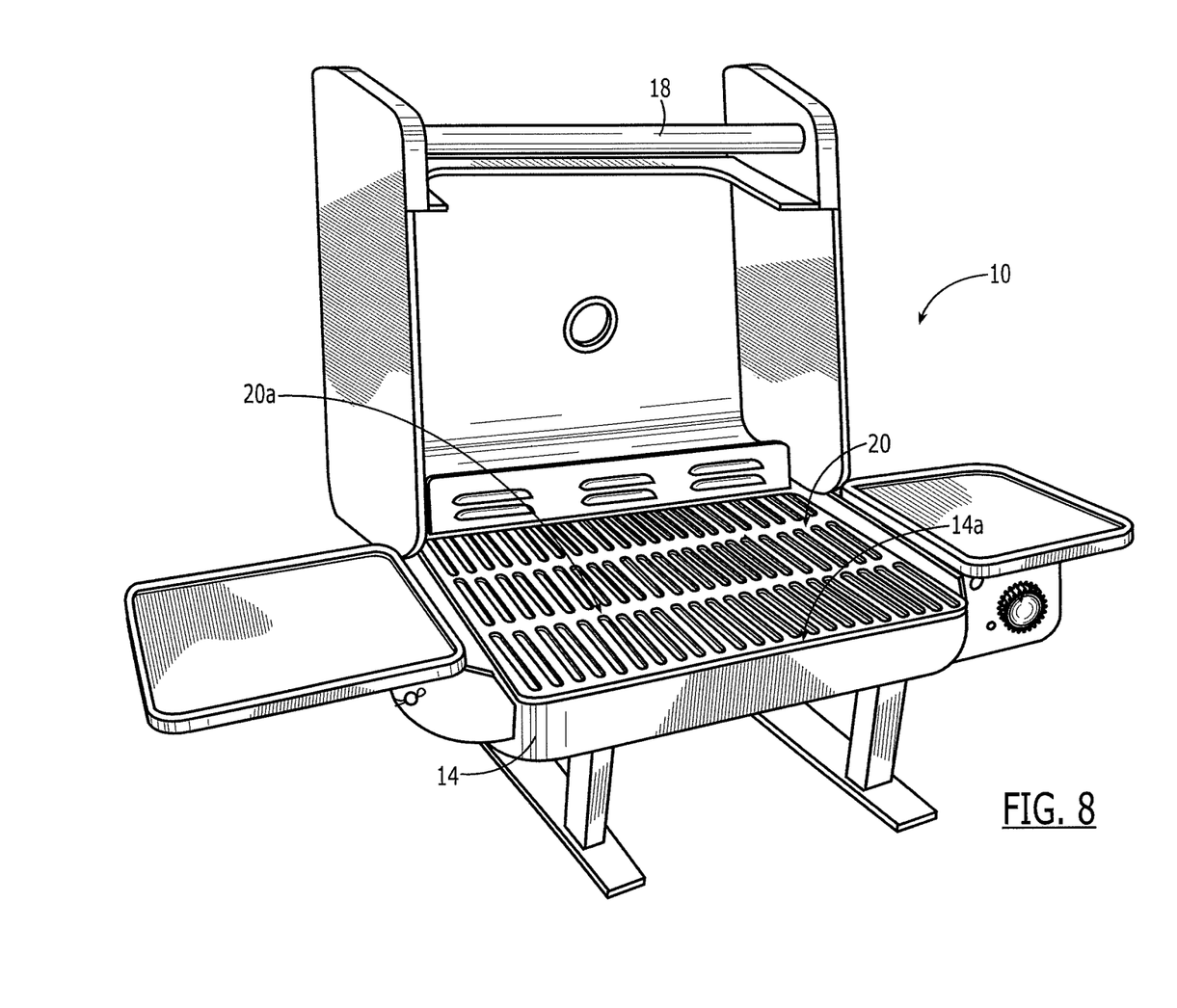
FIG. 8 is a front view of the grill of FIG. 6, showing the grill lid in an open position.
Figure 9:
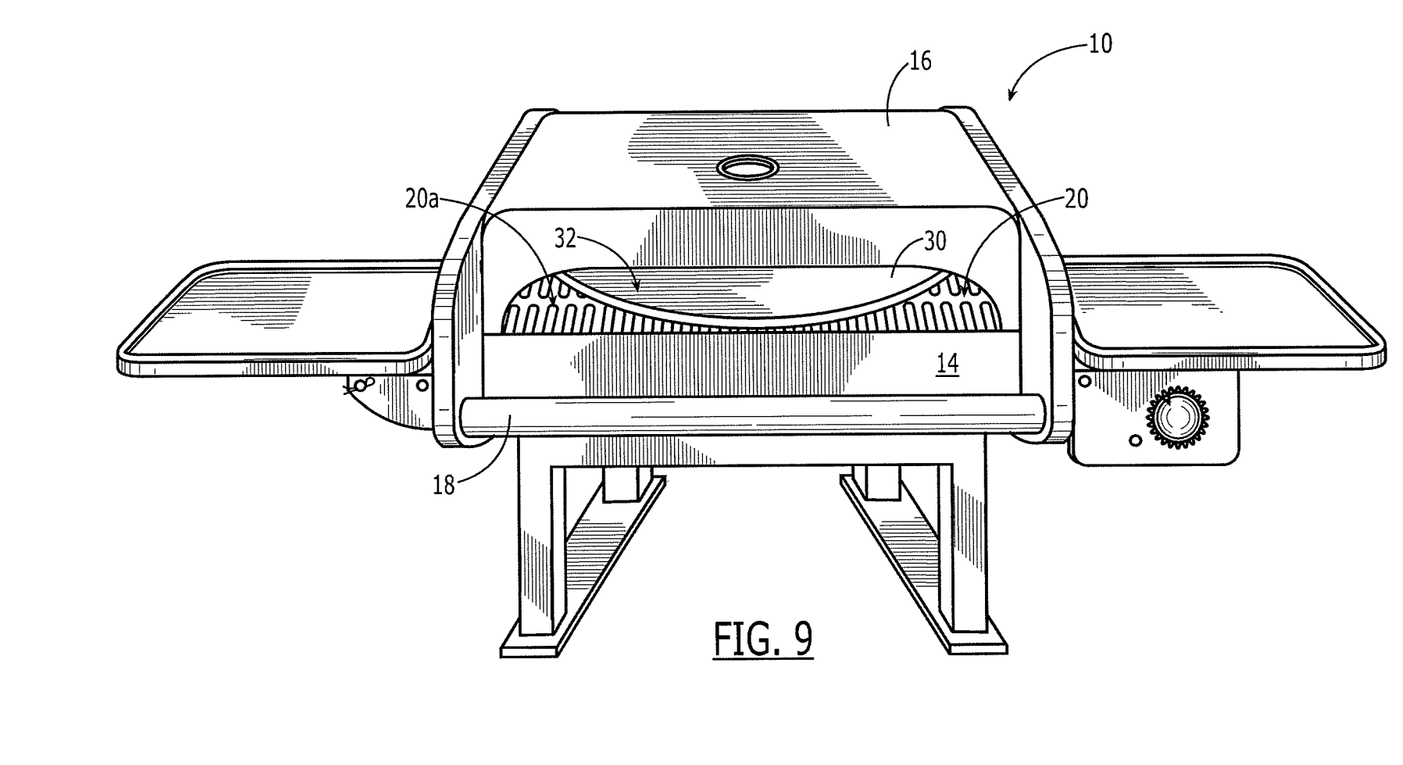
FIG. 9 is a front view of the grill of FIG. 6, shown supporting a pizza stone, with the grill lid shown in a closed position, and the handle removed for illustrative clarity.

FIGS. 6-9 show various view of an alternative grill 10, similar to that of FIG. 3. As will be appreciated from FIGS. 6-9, the handle 18 is supported below the window 19 to allow unobstructed access to the cooking chamber 15 via the window 19. Further, in this embodiment, the grate 20 is supported relative to the base portion 14 such that the upper edge 14a of the base portion 14 is essentially flush with the top surface 20 of the grill, as is common in many conventional grills. Further, it is noted that upper edge 14a cooperates with edge 16b of the lid 16 to define the window 19, as best shown in FIGS. 7 and 8. Accordingly, it is relatively easy to introduce into the cooking chamber food, or a pizza stone 30, e.g., using a pizza peel, and to position it on the top surface 20a of the grate 20, as will be appreciated from FIG. 9, in which the handle has been removed for illustrative clarity.

Figure 10:
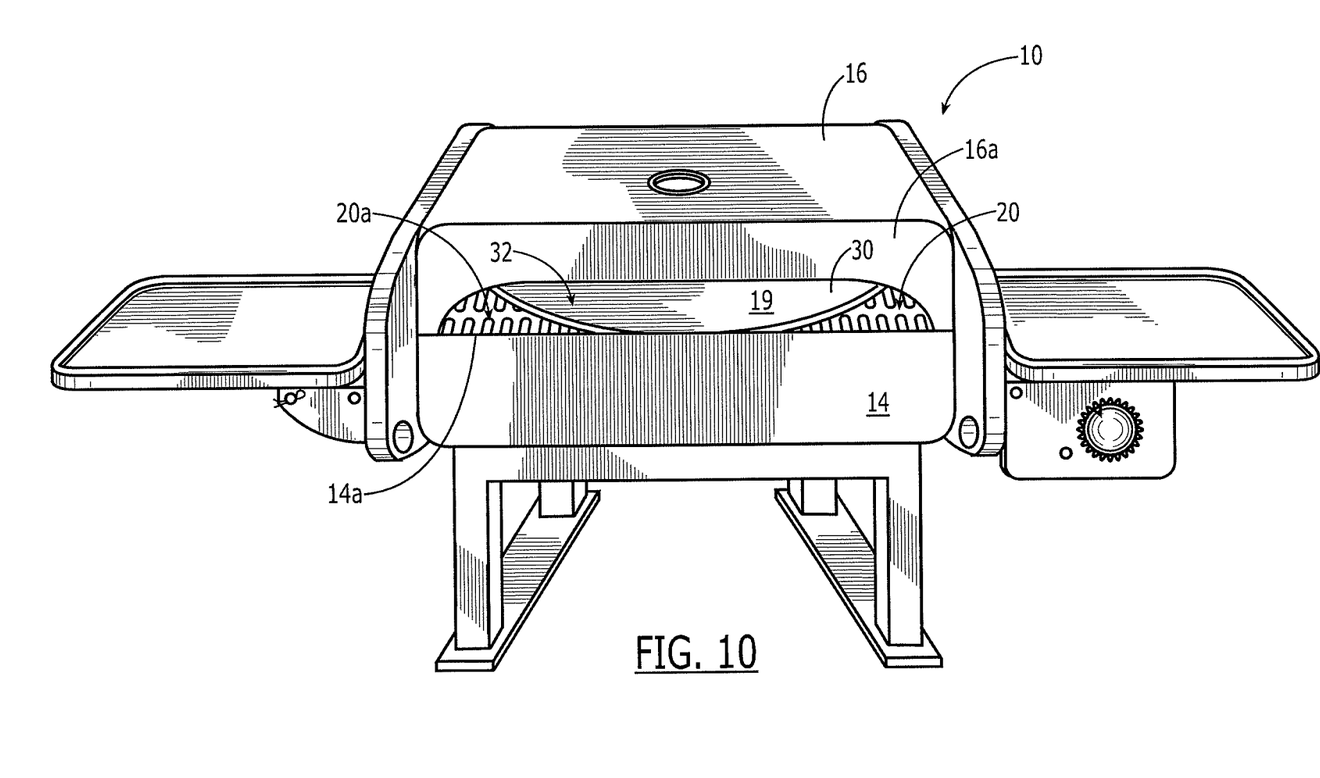
FIG. 10 is a front view of an alternative embodiment of the grill of FIG. 6 in which the top surface of the grate is positioned below a top surface of the base portion, with the handle removed for illustrative clarity.

FIG. 10 is a front view of an alternative embodiment of the grill 10 of FIG. 6 in which the base portion 14 is constructed such that the top surface 20a of the grate 20 is positioned below an upper edge 14a of the base portion 14, with the handle removed for illustrative clarity. In such an embodiment, the upper edge 14a extends above the to surface 20a of the grate—and preferably an amount greater than or equal to a thickness of an associated cooking surface 30, such as a pizza stone. Accordingly, in such an embodiment, the upper edge 14a of the base portion 14 is essentially flush with the top surface 32 of the pizza stone 30 when the pizza stone 30 is supported on the grate 20. Accordingly, it is relatively easy to introduce into the cooking chamber and onto the cooking surface/pizza stone 30 food, such as a pizza, e.g., using a pizza peel.

The grill may be sold in a kit along with a cooking surface 30, such as a pizza stone, a pizza pan (not shown) and/or a conventional pizza peel (not shown). For cooking foods other than pizzas and the like, the apparatus may be sold with a skillet (not shown) or other or additional cooking apparatus.

In use, an exemplary grill 10 may be prepared for use by grasping the grill's handle, manipulating the handle to open the grill's lid 16, placing a cooking surface 30 onto the grill's grate 20, and manipulating the grill's handle to close the grill's lid 16. In the closed position, the lid 16 cooperates with the base portion 14 to define the window 19. Alternatively, the grill 10 may be prepared for use by placing the lid 16 in the closed position, and inserting a cooking surface 30 through the window 19 and onto the grate. The grill may then be heated in a conventional manner—e.g., by opening a valve to start a flow of propane into the cooking chamber and then igniting the gas by way of a match or other ignition source. The lid may be opened or closed by manual grasping and manipulation of the handle 18. The burning fuel will cause the air temperature within the grill's cooking chamber to rise. After the grill has reached operating temperature, e.g., as indicated by an integral thermometer supported on the lid 16, the grill is ready for use to cook food.

Food may then be place on the cooking surface by maneuvering the food horizontally, along an entrance pathway extending horizontally from the window 19, through the window 19 and into the cooking chamber (i.e., between the lid 16 and base portion 14). Notably, this pathway is unobstructed by the handle 18 when the lid 16 is in the closed position, to facilitate passing of food into the cooking chamber. Although heat may escape through the window, a suitable cooking temperature will be maintained.

During the cooking process, the food may be observed by direct observation through the window 19. If desired, the lid may be opened by manipulation of the handle, although for many cooking applications it may be preferable not to open the lid during the cooking process. When the cooking process is complete, the food may be removed from the cooking chamber. By way of example, this may be achieved using a pizza peel or spatula, with or without opening of the lid 16.

After the cooking process has completed and the grill has cooled sufficiently, it may be desirable to open the lid to facilitate access to the cooking surface 30 and/or the grate 20 for cleaning and/or removal purposes.

It should be noted that the grill 10 may used not only as a substantially closed (except for the window 19) oven (with the lid in the closed position) to cook pizzas and the like, but also as a conventional hinged-lid grill, e.g., to cook traditional grill foods such as hamburgers, hot dogs, chicken, fish, etc.—with the lid in the open position, or in the closed position.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A cooking grill combination for cooking food items insertable and removable from the grill, the cooking grill combination comprising:
    a pizza peel;
    a frame;
    a base portion supported on said frame, the base portion having a front portion and a rear portion opposite the front portion;
    a cooking grate supported on said base portion;
    a hinge supported on the rear portion of the base portion;
    a lid hingedly-attached to the base by the hinge and movable between an open position and a closed position, the lid being constructed of continuous material having a peripheral edge, the peripheral edge being contoured to mate with the base portion when the lid is in the closed position except at the front portion of the base portion where the peripheral edge cooperates with the base portion while the lid is in the closed position to define an open window having a height greater than a height of the pizza peel, the window thereby admitting passage of food items supported on the pizza peel to be inserted into the cooking chamber along an entrance pathway extending horizontally from the window while the lid is in the closed position, and exhausting heated air from the cooking chamber, the lid and base portion thereby cooperating to define therebetween a substantially enclosed cooking chamber that is enclosed except at the window when the lid is in the closed position; and
    a handle joined to said lid in a position outside of the entrance pathway;
    wherein the grill excludes any door, flap, hinge, cover or drawer structure operable to close or cover the open window when the lid is in the closed position.

2. The cooking grill combination of claim 1, wherein said lid comprises a planar portion defining a vertically-oriented sidewall having a peripheral edge, and wherein said window is defined in said planar portion as a vertically-oriented window.

3. The cooking grill combination of claim 2, wherein said sidewall is a front wall of said lid.

4. The cooking grill combination of claim 1, wherein said lid comprises a sidewall having a peripheral edge, and wherein said window is defined in said sidewall by said peripheral edge.

5. The cooking grill combination of claim 1, wherein said sidewall is generally planar.

6. The cooking grill combination of claim 5, wherein said side comprises a generally-planar portion extending along said window.

7. The cooking grill combination of claim 1, wherein said handle comprises a linearly-extending member of substantially uniform cross-section.

8. The cooking grill combination of claim 7, wherein the handle is supported below said window when said lid is in the closed position.

9. The cooking grill combination of claim 8, wherein said handle is supported on handle supports extending from said lid.

10. The cooking grill combination of claim 1, wherein said handle is supported in a laterally-extending position spanning said window.

11. The cooking grill combination of claim 1, wherein said handle is supported on said lid in a longitudinally-extending position that does not span said window.

12. The cooking grill combination of claim 1, wherein said handle is supported on said lid in a position extending laterally away from a side of said lid.

13. The cooking grill combination of claim 1, wherein said base portion has an upper edge, and wherein said base portion is configured to support said cooking grate in a generally horizontal position in which a top surface of said cooking grate is positioned substantially flush with said upper edge.

14. The cooking grill combination of claim 1, wherein said base portion has an upper edge, and wherein said base portion is configured to support said cooking grate in a generally horizontal position in which a top surface of said cooking grate is positioned below said upper edge.

15. The cooking grill combination of claim 1, further comprising a cooking surface having a maximum thickness, wherein said base portion has an upper edge, and wherein said base portion is configured to support said cooking grate in a generally horizontal position in which a top surface of said cooking grate is positioned below said upper edge by a dimension approximately equal to said maximum thickness.

16. The cooking grill combination of claim 1, further comprising a cooking surface having a maximum thickness, wherein said base portion has an upper edge, and wherein said base portion is configured to support said cooking grate in a generally horizontal position in which a top surface of said cooking grate is positioned below said upper edge, and in which a top surface of said cooking surface is substantially flush with said upper edge when said cooking surface is supported on said grate.

17. The cooking grill combination of claim 1, further comprising:
a cooking surface.

18. The cooking grill combination of claim 1, further comprising a cooking surface having a maximum thickness, wherein said base portion has an upper edge, and wherein said base portion is configured to support said cooking grate in a generally horizontal position in which a top surface of said cooking grate is positioned below said upper edge by a dimension approximately equal to said maximum thickness.

19. A cooking grill combination for cooking food items insertable and removable from the grill, the cooking grill combination comprising:
a pizza peel;
a base portion having a front portion and a rear portion opposite the front portion;
a cooking grate supported on said base portion;
a hinge supported on the rear portion of the base portion;
a continuous lid hingedly-attached to the base by the hinge and movable between an open position and a closed position, the lid having a peripheral edge, the peripheral edge being contoured to mate with the based portion when the lid is in the closed position except at the front portion of the base portion where the peripheral edge cooperates with the base portion while the lid is in the closed position to define a window having a height greater than a height of the pizza peel, the window thereby admitting passage of food items supported on the pizza peel to be inserted into the cooking chamber along an entrance pathway extending horizontally from the window while the lid is in the closed position, and exhausting combustion products from the cooking chamber, the lid and base portion thereby cooperating to define therebetween a substantially enclosed cooking chamber that is enclosed except at the window when the lid is in the closed position; and
a handle joined to said lid in a position outside of the entrance pathway;
wherein the window is open and unobstructed when the lid is in the closed position; and
wherein said grill excludes any door, flap, hinge, cover or drawer structure operable to close or cover the window when the lid is in the closed position.

20. The cooking grill combination of claim 19, further comprising:
a cooking surface.

21. A cooking grill combination for cooking food items insertable and removable from the grill, the cooking grill combination comprising:
a pizza peel;
a base portion having a front portion and a rear portion opposite the front portion;
a cooking grate supported on said base portion;
a hinge supported on the rear portion of the base portion;
a continuous lid having a peripheral edge, the lid being hingedly-attached to the base by the hinge and movable between an open position and a closed position, the peripheral edge of the lid having a first portion extending linearly to mate with the base portion, and a second portion extending non-linearly and being contoured to define at the front portion of the base portion a window having a height greater than a height of the pizza peel, the window thereby admitting passage of food items supported on the pizza peel to be inserted into the cooking chamber along an entrance pathway extending horizontally from the window while the lid is in the closed position, and exhausting combustion products from the cooking chamber, the lid and base portion thereby cooperating to define therebetween a substantially enclosed cooking chamber that is enclosed except at the window when the lid is in the closed position;
wherein the grill provides an open and unobstructed window that excludes a door, flap, cover or drawer operable to close or cover the open window when the lid is in the closed position.

22. The cooking grill combination of claim 21, wherein said lid comprises a sidewall, said peripheral edge extending along said sidewall.

23. The cooking grill combination of claim 21, wherein said lid comprises a sidewall defining a front wall of said lid, said peripheral edge being non-linear and extending along said sidewall to define said open window in said front wall of said lid.

* * * * *